3,284,507
PROCESS FOR PREPARING ALDEHYDES AND KETONES

Günter Mau, Frankfurt am Main, Germany, assignor to Farbwerke Hoechst Aktiengesellschaft vormals Meister Lucius & Bruning, Frankfurt am Main, Germany, a corporation of Germany
No Drawing. Filed July 16, 1963, Ser. No. 295,514
Claims priority, application Germany, July 20, 1962,
F 37,366
4 Claims. (Cl. 260—597)

The present invention relates to a process for preparing aldehydes and ketones.

It has been known to oxidize olefins into aldehydes and/or ketones, for example by the process described in Belgian Patent 569,036, by treating the olefins with oxygen or gases containing oxygen and aqueous solutions containing a noble metal salt, for example palladium chloride, and a reducible metal compound, for example copper II chloride. The aldehydes and/or ketones thus obtained have one double bond less than the olefins from which they have been prepared, but they have the same number of carbon atoms as the starting olefins. As starting compounds there are generally used olefinic hydrocarbons, preferably those containing 2 to 12 carbon atoms.

In the course of the oxidation of the olefin, the copper II chloride of the catalyst is reduced to equal molar quantities of copper I chloride and hydrogen chloride, which compounds are then oxidized by means of oxygen with the re-formation of copper II chloride.

It has been found that, in the oxidation of olefins in the presence of catalysts based on metal chlorides, small amounts of α-chlorocarbonyl compounds form in addition to the desired carbonyl compounds. For example, monochloroacetaldehyde forms from acetaldehyde and mono- and α,α-dichloroacetone form from acetone. The chlorination process is obviously due to the presence of chlorides, in particular copper II chloride. Probably it proceeds according to the following equation:

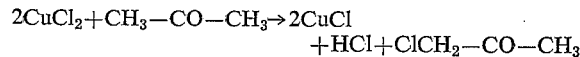

$2CuCl_2 + CH_3-CO-CH_3 \rightarrow 2CuCl + HCl + ClCH_2-CO-CH_3$

This secondary reaction which takes place during the oxidization of olefins causes trouble when carrying out the process industrially since the catalyst loses chloride ions and since the separation of the chlorine-containing carbonyl compounds from the chlorine-free carbonyl compounds by distillation is expensive. Moreover, the aforesaid secondary reaction impairs the yield of the desired chlorine-free carbonyl compound, fresh chloride ions have to be supplied to the catalyst, and the chlorinated secondary products have to be removed.

The extent to which the chlorination reaction takes place when certain olefins are used depends not only on the pressure, the temperature, the residence time, and the kind of olefin used, but also on the composition of the catalyst. For example, it is known that the chlorination of acetone with copper II chloride solutions, which is accompanied by the formation of chloracetone, is favored, that is to say accelerated, when the concentration of $Cu^{++}$ ions and $Cl^-$ ions is increased in the solution. In fact, when the concentration of copper II chloride contained in the catalysts solution is reduced, the undesired chlorination reaction is restrained.

However, it is an essential condition of the industrially most important form of carrying out the oxidation of olefins that the catalyst contain copper II chloride. This is necessary in order to reoxidize to its salt form elemental noble metal formed by reaction of noble metal salts in the catalyst with the olefin. In this reoxidation step, a part of the copper II chloride is reduced to copper I chloride. When operating continuously a certain amount of copper I chloride is therefore always present in the catalyst solution. As is known, however, copper I chloride is insoluble in water and practically it can be kept in solution in the aqueous solution of the catalyst only when the latter also contains a sufficient amount of copper II chloride. The concentration of copper II chloride must not, therefore, be below a certain limit since otherwise copper I chloride and/or elemental noble metal would precipitate.

Accordingly, there are generally used in practice catalyst solutions which contain 0.5 to 1.5 mols of copper chlorides.

Tests have shown that the chlorination reaction depends to a large extent on the chloride concentration of the catalyst and that copper II chloride can, to a large extent (to about 50%), be replaced by equivalent amounts of other metal chlorides, whereby the speed of the chlorination reaction is neither reduced nor increased. Nor does the speed of the olefin reaction itself, that is to say the speed at which the carbonyl compound forms from olefin and copper II chloride in the presence of palladium chloride, practically undergo any change when a portion of the copper II chloride is replaced by other metal chlorides. If, however, the metal chlorides are present in the catalyst, in addition to a certain amount of copper II chloride, the chlorination reaction is notably increased, whereas the speed of the olefin oxidation is just as notably reduced.

Now I have found that the chlorination reactions are considerably inhibited when the catalyst solution contains ions of cadmium and/or zinc and that a catalyst to which a cadmium salt and/or a zinc salt has or have been added reacts more quickly with the olefin to be treated than a catalyst solution that does not contain the aforesaid salt or salts. The solubility of copper I chloride is increased a little by the addition of $CdCl_2$ or $ZnCl_2$, although this increase is not so strong as that obtained by the addition of other metal chlorides.

Instead of the chlorides of the aforesaid metals, other salts may be used, for example, the nitrates or sulfates. In these cases, the speed of the chlorination reaction is even smaller and the speed of the olefin oxidation even greater than in cases in which chlorides are used. But, on the other hand, when the catalyst contains, for example, $Cd(NO_3)_2$, the solubility of copper I chloride is smaller than in cases in which the catalyst solution does not contain an additive or contains $CdCl_2$.

The above-mentioned salts or the cadmium ions and/or zinc ions may be added to the catalyst in an amount of up to 2.5 mols per liter, calculated on the catalyst solution.

In solutions containing about 0.5 to 1.5 mols per liter of copper, the molar ratio of Cu to Cd or Cu to Zn is suitably within the range of about 0.5 to 10.

The use of salts of cadmium and zinc according to the invention as constituents of catalyst solutions containing copper II chloride and a noble metal salt and used to catalyze the direct oxidation of olefins into carbonyl compounds, offers the following advantages:

(1) Reduction of the speed of the chlorination reaction with consequently higher yields of the main reaction, resulting in lower expenditure on the isolation and removal of the secondary products;
(2) Acceleration of the olefin oxidation, permitting lower expenses with regard to the dimensions of the reactors and/or the efficiency of the pumps for circulating the catalyst.

The following examples serve to illustrate the invention, but they are not intended to limit it thereto.

Example 1

In the individual experiments which comprises this example, different catalyst solutions were used, each of which contained per liter 10 millimols of $PdCl_2$ and the additives indicated in Table I given below. To one liter of each of the catalyst solutions an excess amount of ethylene, to another liter of three of the catalyst solutions an excess amount of propylene and to a third liter of three of the catalyst solutions an excess amount of butene-2 was added, the excess amounts of ethylene, propylene and butene-2 being introduced into the solution at a temperature of 50° C. under atmospheric pressure and while shaking. The amounts of acetaldehyde, of acetone and propionic aldehyde, and of methyl ethyl ketone which formed are indicated in Table I. Experiments A to D of Table I are comparison tests and experiments E to K were carried out in accordance with the invention.

of these solutions was kept at 60° C. while being stirred and after 15 minutes the content of chlorinated carbonyl compounds were determined. The results are indicated in Table II. Experiments A and F are comparison tests and experiments B to E and G were carried out according to the present invention.

TABLE II

| Experiment | Initial concentration | | | | Rate of change of concentration of— | |
|---|---|---|---|---|---|---|
| | $CuCl_2$ (mols per liter) | Additive | | Cl ions (mols per liter) | Acetone to chloracetone (millimols per liter and per 15 minutes) | Acetaldehyde to chloracetaldehyde (millimols per liter and per 15 minutes) |
| | | Formula | Mols per liter | | | |
| A | 1.0 | | | 2.0 | 40 | 30 |
| B | 1.0 | $ZnCl_2$ | 0.5 | 3.0 | 39 | |
| C | 1.0 | $CdCl_2$ | 0.5 | 3.0 | 28 | 18 |
| D | 1.0 | $Cd(NO_3)_2$ | 0.5 | 2.0 | 10 | |
| E | 1.0 | $Cd(NO_3)_2$ | 1.0 | 2.0 | 4 | |
| F | 0.5 | | | 1.0 | 22 | |
| G | 0.5 | $CdCl_2$ | 0.5 | 2.0 | 11 | |

I claim:
1. In a process for the production of a carbonyl compound from an olefinic hydrocarbon, said carbonyl compound being selected from the group consisting of aldehydes and ketones corresponding to said olefinic hydrocarbon and containing one olefinic bond less than the olefinic hydrocarbon, in the presence of an aqueous solution of a salt of a metal of the platinum group and of a member selected from the group consisting of copper chloride and copper bromide, the improvement which comprises adding cadmium ions to the aqueous solution.

2. A process as in claim 1 wherein said cadmium ions are added in the form of a cadmium salt selected from the group consisting of cadmium chloride, cadmium nitrate, and cadmium sulfate.

3. A process as in claim 1 wherein said aqueous solution contains 0.5 to 1.5 mols per liter of copper ion and the mol ratio of copper ion to cadmium ion in the solution is from about 0.5 to 10.

4. A process as in claim 1 wherein up to 2.5 mols per liter of cadmium ion are added to the aqueous solution.

TABLE I

| Experiment | Initial concentration | | | | Rate of change of concentration of— | | |
|---|---|---|---|---|---|---|---|
| | $CuCl_2$ (mols per liter) | Additive | | $Cl^-$ (mols per liter) | $C_2H_4$ to acetaldehyde (millimols per liter and per minute) | $C_3H_6$ to acetone+ propionic aldehyde (millimols per liter and per minute) | $C_4H_8$ to methyl ethyl ketone (millimols per liter and per minute) |
| | | Formula | Mols per liter | | | | |
| A | 1.0 | | | 2.0 | 0.425 | 0.316 | 0.100 |
| B | 1.5 | | | 3.0 | 0.222 | 0.150 | 0.065 |
| C | 2.0 | | | 4.0 | 0.147 | | |
| D | 2.5 | | | 5.0 | 0.100 | | |
| E | 1.0 | $CdCl_2$ | 0.5 | 3.0 | 0.725 | 0.460 | 0.156 |
| F | 1.0 | $CdCl_2$ | 1.0 | 4.0 | 0.910 | | |
| G | 1.0 | $CdCl_2$ | 1.5 | 5.0 | 1.090 | | |
| H | 1.0 | $ZnCl_2$ | 0.5 | 3.0 | 0.543 | | |
| I | 1.0 | $CdSO_4$ | 1.0 | 2.0 | 3.10 | | |
| K | 1.0 | $Cd(NO_3)_2$ | 0.5 | 2.0 | 2.61 | | |

Example 2

In order to examine the inhibiting action of salts of cadmium and zinc on the chlorination of acetaldehyde and of acetone in the presence of aqueous solutions of copper II chloride, aqueous solutions of the salts indicated in Table II given below were prepared. In one series of experiments the water in which the salts were dissolved contained 50% by volume, calculated on the solution, of acetone, and in another series it contained 50% by volume, calculated on the solution, of acetaldehyde. Each

References Cited by the Examiner

UNITED STATES PATENTS

| | | | |
|---|---|---|---|
| 3,102,147 | 8/1963 | Johnson | 260—597 |
| 3,149,167 | 9/1964 | Hornig et al. | 260—597 |
| 3,154,586 | 10/1964 | Bander et al. | 260—597 |
| 3,172,913 | 3/1965 | Hornig et al. | 260—597 |

LEON ZITVER, *Primary Examiner.*

DANIEL D. HORWITZ, *Examiner.*